United States Patent [19]

Eimen

[11] 4,344,597
[45] Aug. 17, 1982

[54] VEHICLE SEAT WITH FORE-AND-AFT SHOCK ISOLATION

[75] Inventor: Shawn H. Eimen, Milwaukee, Wis.

[73] Assignee: Milsco Manufacturing Company, Milwaukee, Wis.

[21] Appl. No.: 142,339

[22] Filed: Apr. 21, 1980

[51] Int. Cl.³ ............................................. F16F 15/06
[52] U.S. Cl. .................................. 248/561; 248/429; 248/430; 248/563
[58] Field of Search ............... 248/561, 563, 425, 429, 248/430, 393, 397; 267/9 C

[56] References Cited

U.S. PATENT DOCUMENTS

| | | | |
|---|---|---|---|
| 2,834,396 | 5/1958 | Herider et al. | 248/430 X |
| 3,100,617 | 8/1963 | Radke et al. | 248/430 |
| 3,188,045 | 6/1965 | Fowler et al. | 248/429 |
| 3,190,592 | 6/1965 | Grizzle, Jr. | 248/429 |
| 3,258,241 | 6/1966 | Oswald | 248/430 |
| 3,325,137 | 6/1967 | Knudsen | 248/424 |
| 3,335,996 | 8/1967 | Hall et al. | 248/563 |
| 3,390,857 | 7/1968 | Nystrom | 248/575 |
| 4,228,984 | 10/1980 | Thompson et al. | 248/429 X |

FOREIGN PATENT DOCUMENTS

| | | | |
|---|---|---|---|
| 737270 | 6/1966 | Canada | 248/430 |
| 1467257 | 12/1966 | France | 248/430 |

Primary Examiner—James T. McCall
Attorney, Agent, or Firm—James E. Nilles

[57] ABSTRACT

In a seat suspension wherein a seat part is slidable fore-and-aft on a suspension part, a latching member having an elongated slot therein is swingable to and from a normal position about a rivet secured to the seat part and extending through the slot. In its normal position, the latching member engages the suspension part to be locked against fore-and-aft motion, but the seat part can move fore-and-aft between slot-defined limits. A control member is pivoted to the latching member on an axis spaced from and parallel to that of said rivet, which extends through a triangular cutout in the control member. The control member has one limit position wherein a portion of said cutout registers with said slot for fore-and-aft shock isolating motion of the seat part and an intermediate position wherein an apex portion of the cutout engages the rivet to prevent seat part motion. Swinging the control member to an opposite limit position swings the latching member out of normal position for fore-and-aft seat part adjustment. One tension spring urges the seat part forwardly and biases the latching member to normal position, another tension spring urges the seat part rearwardly and biases the control member for toggle motion between its intermediate and opposite limit positions.

4 Claims, 7 Drawing Figures

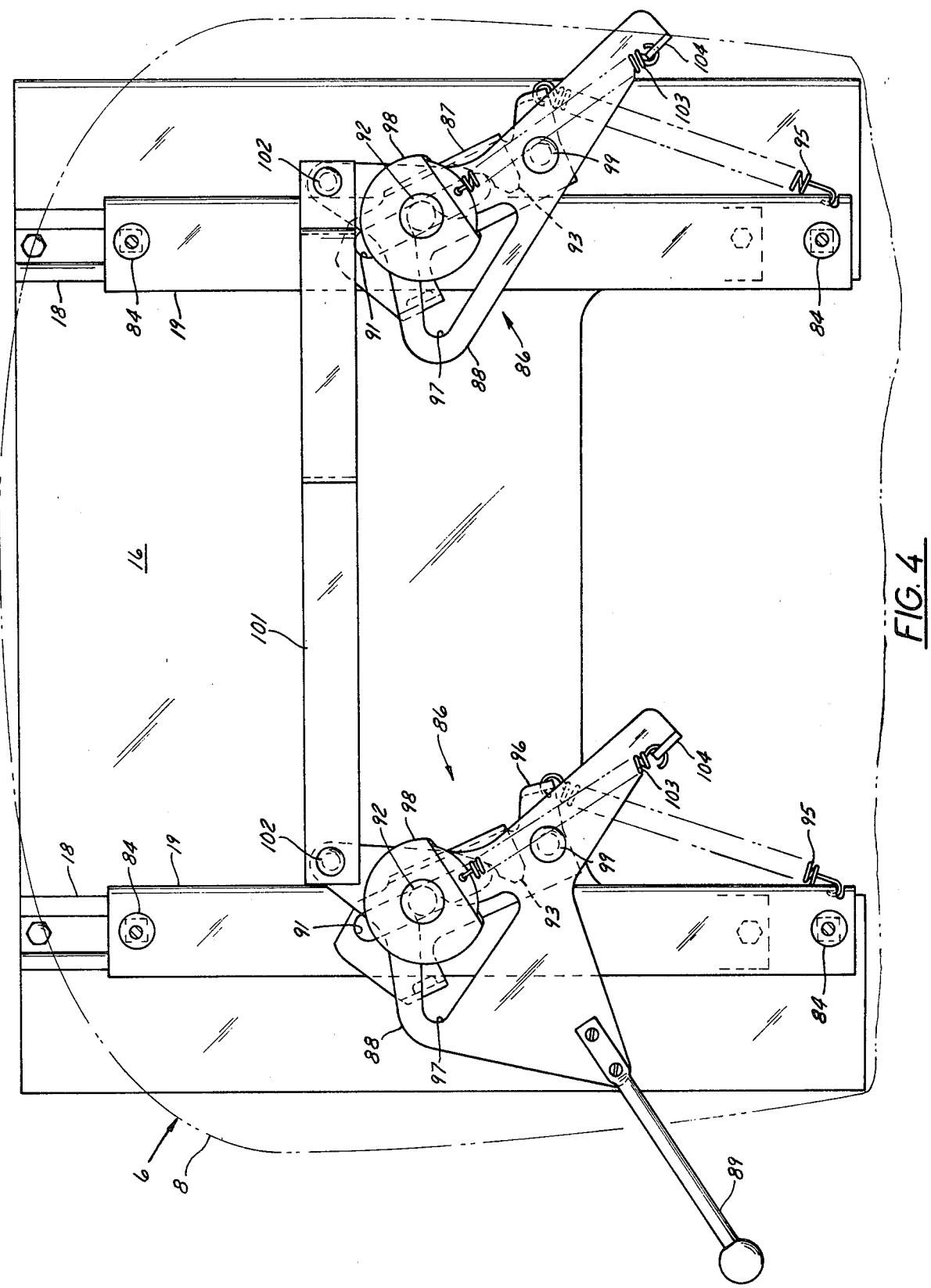

4,344,597

VEHICLE SEAT WITH FORE-AND-AFT SHOCK ISOLATION

FIELD OF THE INVENTION

This invention relates to suspensions for the seats of off-highway and heavy cargo vehicles; and the invention is more particularly concerned with a seat suspension that has means for adjusting the fore-and-aft position of the seat, and means for optionally cutting in or cutting out a fore-and-aft shock isolation system.

BACKGROUND OF THE INVENTION

A seat suspension of the general type to which this invention relates may find utility in a vehicle having an unsprung chassis, such as a tractor or an earth moving machine, or in a truck or truck-tractor that has firm springs for supporting heavy cargo. In general, such a suspension comprises a seat part which supports a seat occupant, a base part which is secured to a vehicle chassis, linkage connected between the seat part and the base part to confine the seat part to substantially up and down motion, and a resilient device (spring or hydropneumatic cylinder) which is also connected between the base part and the seat part to impose yielding upward bias upon the seat part that cushions its up and down motion.

Especially in the case of seats for cab-over-engine vehicles, some operators like to have the seat arranged for absorbing abrupt fore-and-aft accelerations and decelerations as well as vertical shock forces. However, other operators of the same types of vehicles dislike such fore-and-aft shock isolation, and therefore that feature should be optional and capable of being readily cut in or cut out by the seat occupant. Whether or not fore-and-aft isolation is available, the seat should provide for fore-and-aft adjustability. With fore-and-aft isolation effective, the seat should have a static or nominal position to which it has been adjusted according to the occupant's desires and from which it makes limited shock-absorbing excursions through about equal distances forwardly and rearwardly, in each case against bias that urges the seat back to the static position.

The general object of the present invention is to provide a seat suspension having a single easily manipulated control that can be moved to one position at which the seat part has fore-and-aft shock isolation, another position in which the seat part is confined against fore-and-aft motion, and a third position in which the seat part is released for fore-and-aft adjustment through a range of positions.

Another and more specific object of the invention is to provide a seat suspension having a pair of tension springs which respectively provide for forward bias and for rearward bias on the seat part when the apparatus is in its fore-and-aft shock isolation mode, and wherein one of those springs also serves to bias a latching member to a locked position in which it releaseably holds the seat part in a desired position of fore-and-aft adjustment, while the other of said springs provides for toggle action of a control member whereby fore-and-aft isolation is either cut in or cut out, to hold that control member in whichever position is selected for it.

It is also an object of this invention to provide a simple control mechanism for a seat suspension wherein a seat part is mounted on a suspension part for fore-and-aft motion relative thereto, said control mechanism comprising a latching member that is movable to and from a normal position wherein it has locking engagement with the suspension part and a control member that has three defined positions, namely, a first position wherein the control member holds the latching member out of its normal position to permit fore-and-aft adjustment of the seat part, a second position wherein the control member maintains the seat part locked to the latching member and allows the latter to remain in its normal position so that the seat part is confined against fore-and-aft motion, and a third position in which the latching member likewise remains in its normal position but the seat part is allowed to make limited forward and rearward shock isolating excursions relative to it.

In general, these objects of the invention are achieved in structure wherein a seat part is supported on a suspension part for fore-and-aft motion relative thereto, which structure comprises a latching member and cooperating means on the seat part and on the latching member whereby the latter is connected with the seat part to swing relative thereto about a first axis. Such swinging carries the latching member between a normal position, wherein a latch part on the latching member engages said suspension part to confine the latching member against fore-and-aft movement relative to the suspension part, and a releasing position wherein the latch part is disengaged from the suspension part. Said cooperating means further provides for limited fore-and-aft sliding of the seat part relative to the latching member when the latter is in its normal position. There is also a manually shiftable control member, and pivot means connecting said control member with the latching member for swinging relative thereto about a second axis which is spaced from and parallel to said first axis. Such swinging in one direction carries the control member from an intermediate position to a first limit position wherein the control member leaves the latching member free for fore-and-aft sliding relative to the seat part. Cooperating abutment means on the seat part and on the control member are engaged when the control member is in said intermediate position, to confine the control member against fore-and-aft movement relative to the seat part, thus locking the seat part to the latching member; and said abutment means provided a fulcrum about which the control member can be swung in the opposite direction, from its intermediate position to a second limit position, while said pivot means constrains the latching member to swing to its releasing position.

With the control member in its intermediate position, one tension spring, connected between the latching member and the seat part, yieldingly resists rearward motion of the seat part and another tension spring, connected between the control member and the seat part, yielding resists forward motion of the seat part. Said one tension spring also serves to bias the latching member to its latching position; and said other tension spring also imposes a toggling bias force upon the control member as it is swung between its intermediate position and its first limit position.

BRIEF DESCRIPTION OF THE DRAWINGS

In the accompanying drawings, which illustrate what is now regarded as a preferred embodiment of the invention:

FIG. 4 is a view generally similar to FIG. 2, but showing the apparatus in its condition wherein the seat part is released for fore-and-aft adjustment;

FIG. 5 is a detail sectional view taken on the plane of the line 5—5 in FIG. 2;

DETAILED DESCRIPTION OF PREFERRED EMBODIMENT OF THE INVENTION

Figure 1:
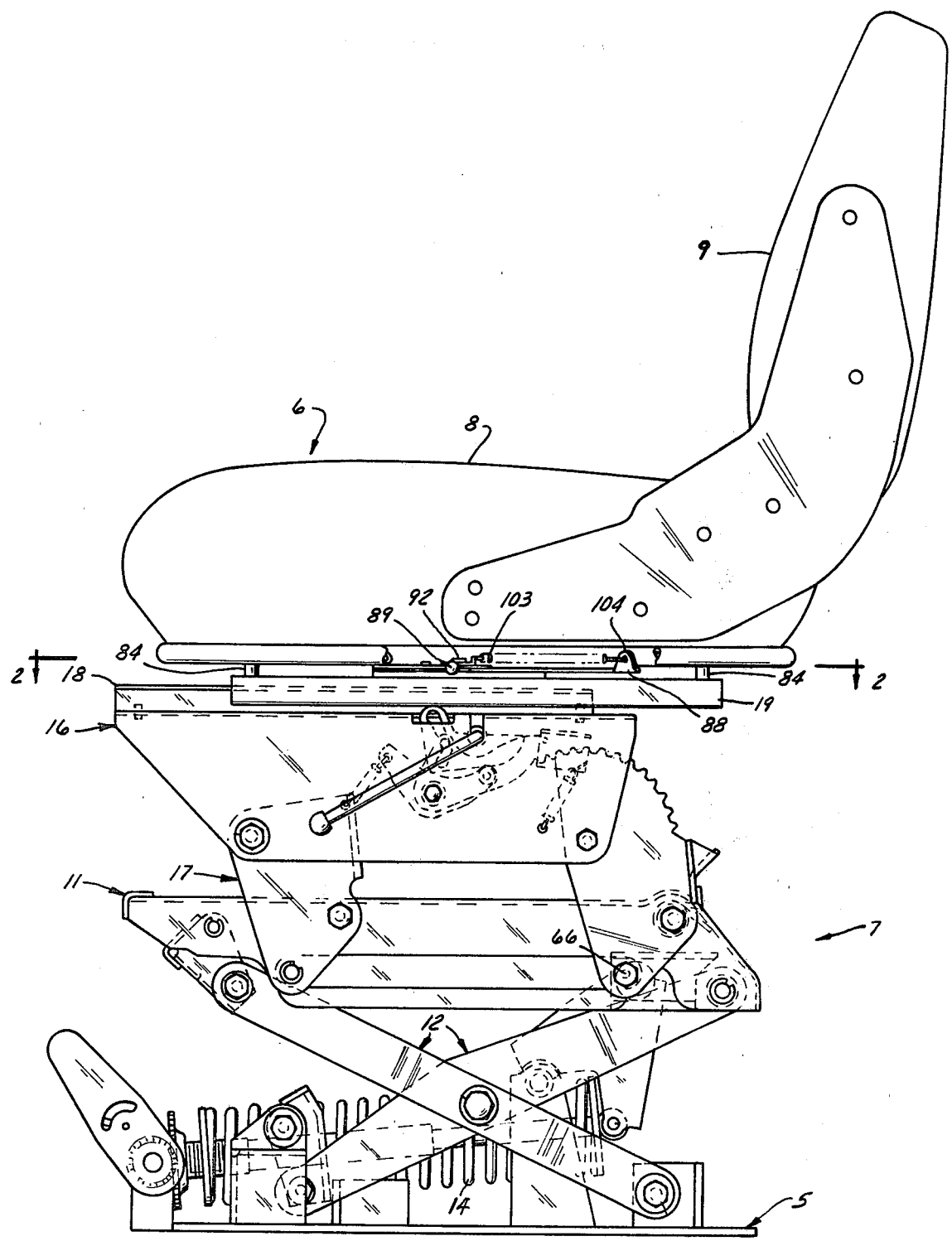
FIG. 1 is a view in side elevation of a seat suspension embodying the principles of this invention.

A seat suspension embodying the principles of this invention comprises a base part 5 that is intended to be secured to a vehicle chassis or the like and a seat part 6 that is connected with the base part by means of suspension structure designated generally by 7. The seat part 6, as is conventional, comprises a generally horizontal member 8 that can be in the nature of a cushion, and it preferably has a back rest 9 that projects up from the rear of the horizontal member.

The suspension structure 7 can be regarded as comprising three subassemblies, each performing a substantially distinctive function but each having some components in common with at least one of the other subassemblies.

The lowermost of these subassemblies provides for relative up and down shock isolating motion between the base part 5 and the seat part 6, and it comprises the base part, an intermediate carriage 11 that comprises a rectangular, generally horizontal frame, and a scissors linkage 12 that is connected between the base part 5 and the intermediate carriage 11 to confine the latter to vertical substantially translatory motion relative to the base part. Also connected between the base part 5 and the intermediate carriage 11 is a resilient device 14, here illustrated as a coiled compression spring.

The second subassembly provides for height adjustment of the seat and comprises the intermediate carriage 11, an upper carriage 16, and an adjustable parallelogram linkage 17 that is connected between the two carriages 11 and 16.

The third subassembly, located just below the seat part 6, provides for fore-and-aft adjustment and fore-and-aft shock isolation of the seat part. It comprises a pair of fore-and-aft extending guide rails 18, mounted on the top of the upper carriage 16 near its opposite sides, and a pair of channel-like guide ways 19 which are secured to the underside of the seat part 6 and which cooperate with the respective guide rails 18 to confine the seat part to fore-and-aft motion relative to the upper carriage 16.

The two lower subassemblies may be generally conventional but as far as the present invention is concerned, the portion of the suspension that is at and below the level of the guide rails is merely representative of any supporting structure which is substantially confined against fore-and-aft motion and on which a seat is guided for fore-and-aft motion.

The guide ways 19 that slide on the relatively fixed rails 18 comprise elongated channels which are secured to the seat part 6 at their opposite ends by means of short, downwardly projecting spacers 84. Balls 85 are confined between the rails 18 and guide ways 19 in a known arrangement, for a freely sliding connection between them.

Two essentially identical control devices 86, one at each side of the suspension, provide for fore-and-aft seat adjustment and for cutting in and cutting out fore-and-aft isolation. The two control devices 86 are connected for operation in unison, as explained hereinafter. Each control device 86 is located in the space between a guide way 19 and the underside of the seat part 6, and it comprises a latching member 87 and a control member 88 that is swingable by means of an actuating handle 89.

Each latching member 87 has a flat, elongated top portion 90 that overlies the top surface of the guideway channel 19 and wherein there is a lengthwise extending slot 91 through which a front shoulder rivet 92 extends to connect the latching member with the guide way. There is a laterally inwardly projecting tang or tongue 93 on each latching member 87, near a front end of it and in downwardly offset relation to its flat top portion 90, for engagement in any one of a series of slots or notches 94 in the underlying guide rail channel 18 that are spaced at uniform short intervals along its length. The tongue 93 is thus engaged in a notch 94 when the latching member 87 is in a normal locking position, and such engagement holds the latching member against lengthwise motion relative to the underlying rail 18.

Each latching member 87 can swing to and from its locking position about the vertical axis defined by the front shoulder rivet 92 that connects it with the guideway channel 19, and it is biased toward that position by means of a coiled tension spring 95 that has a rear end connected to the guideway channel 19 at a distance behind the latching member and has its front end connected to a lug 96 on the latching member that is spaced both laterally from its slot 91 and to the rear thereof. With the latching member 87 in its normal position, the guideway channel 19 to which it is connected by the rivet 92 can move lengthwise relative to it through a distance defined by engagement of that rivet against the ends of the slot 91, and the tension spring 95 tends to draw the guideway 19 forwardly and thus imposes a forward bias upon the seat part 6.

Overlying the flat top portion 90 of each latching member 87 is its control member 88, which is substantially flat and has a triangular notch or cutout 97 therein through which the front shoulder rivet 92 extends. A large diameter washer-like disc 98, confined under the head of the rivet 92, overlies the top surface of the control member 88 to confine it to edgewise motion. Behind the triangular cutout 97 the control member 88 has a pivot connection 99 with the latching member 87, comprising a rear shoulder rivet and providing for substantially horizontal edgewise swinging of the control member 88 relative to the latching member 87. Such swinging motion is imparted to one of the two control members 88 by means of the lever handle 89, which is accessible at one side of the suspension, and the other control member is constrained to swing in unison with it by a tie strut 101 that has, at its opposite ends, pivot connections 102 with the respective control members, at corresponding locations on the control members that are spaced, in each case, from both the cutout 97 and the rear rivet 99.

Figure 2:
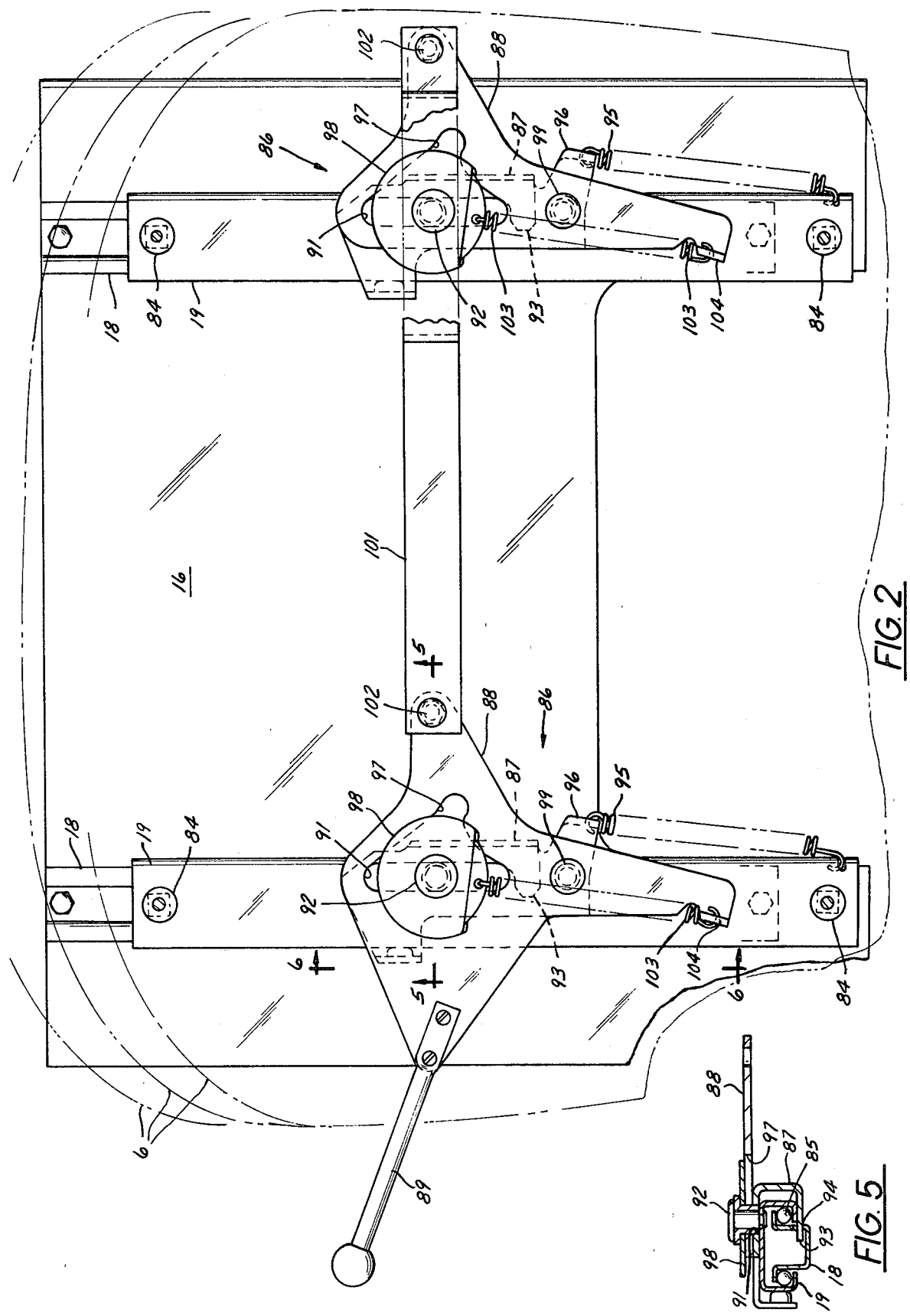
FIG. 2 is a view in section, taken on the plane of the line 2—2 in FIG. 1, showing the means for controlling fore-and-aft seat motion, in the condition that provides for fore-and-aft shock isolation.

For fore-and-aft shock isolation, the control handle 89 is in a forward position, illustrated in FIG. 2, so that each control member 88 is in a position wherein an elongated portion of its triangular cutout 97 is in register with the whole of the slot 91 in its underlying latching member 87, and therefore, the control member 88 leaves the latching member in its normal locking position and presents no interference to sliding of the front shoulder rivet 92 in the slot 91. Under these conditions, as has already been explained, the tension spring 95 reacts between the latching member 87 and the guideway channel 19 to urge the latter forwardly. At the same time, a rearward biasing force is also exerted upon the channel 19 by another tension spring 103 that has its front end connected to the washer-like disc 98, and thus to the front shoulder rivet 92 and the channel 19, and has its rear end connected to a lug 104 on the rear end portion of the control member 88, which lug is captive because the control member 88 is fixed in relation to the latching member 87 at rear rivet 99, the latter, is locked by its tongue 93 to the upper carriage 16. When the front shoulder rivet 92 is centered along the length of the slot 91 in the latching member, the rearward biasing force which the spring 103 exerts upon the guideway channel 19 through said shoulder rivet 92 is equal to the forward biasing force which the spring 95 exerts directly upon the same channel. The two springs 95 and 103 thus tend to hold the guideway channel 19 in the mid fore-and-aft position at which the front shoulder rivet 92 is midway between the ends of the slot 91, establishing a nominal or static position for the seat; and as the seat moves either forward or rearward from that position it meets with yielding but increasing resistance by which it is urged back to that position.

Figure 3:
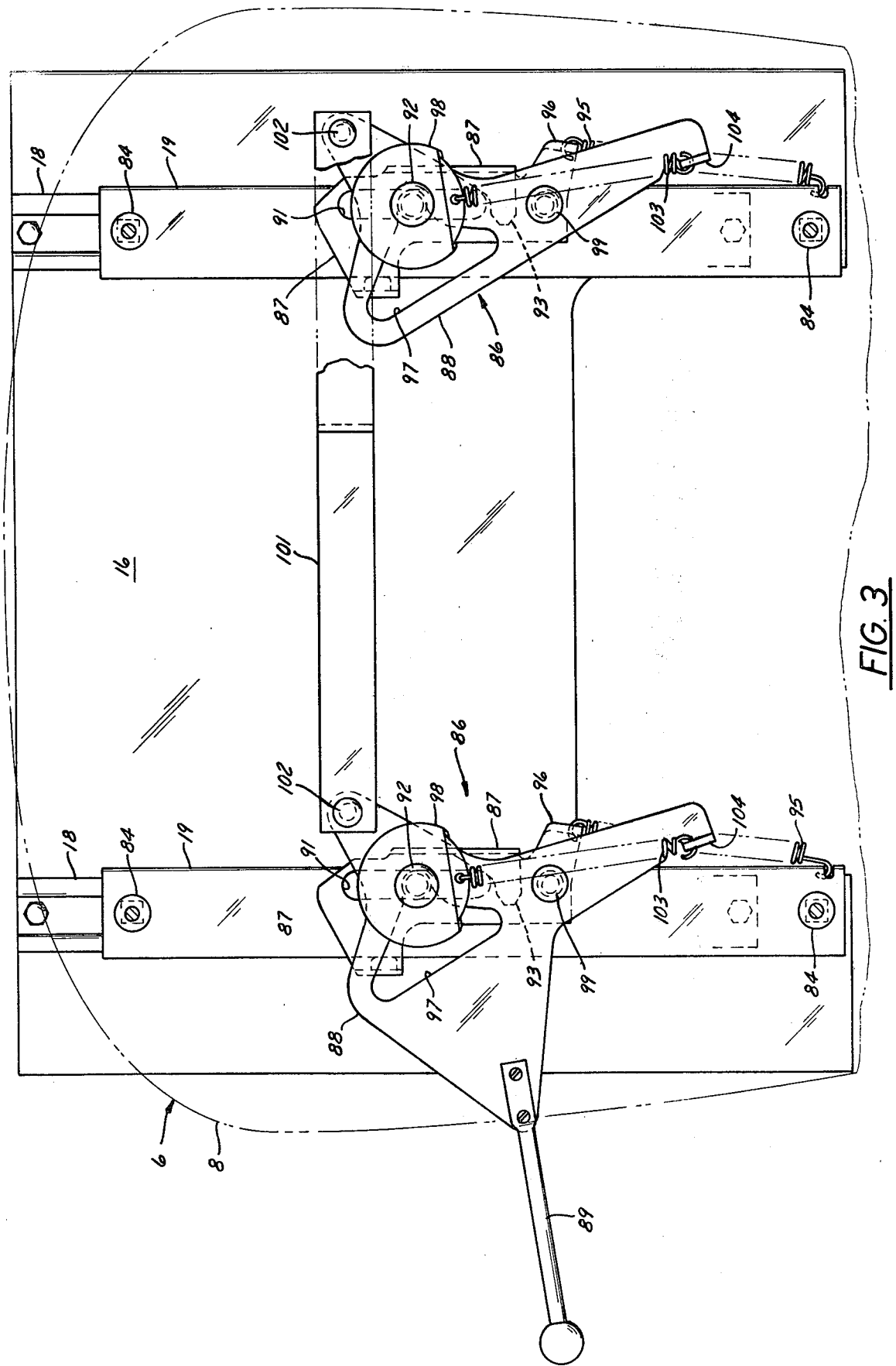
FIG. 3 is a view generally similar to FIG. 2, but showing the apparatus in its condition wherein fore-and-aft shock isolation is cut out and the seat part is confined against fore-and-aft motion.
Figure 6:
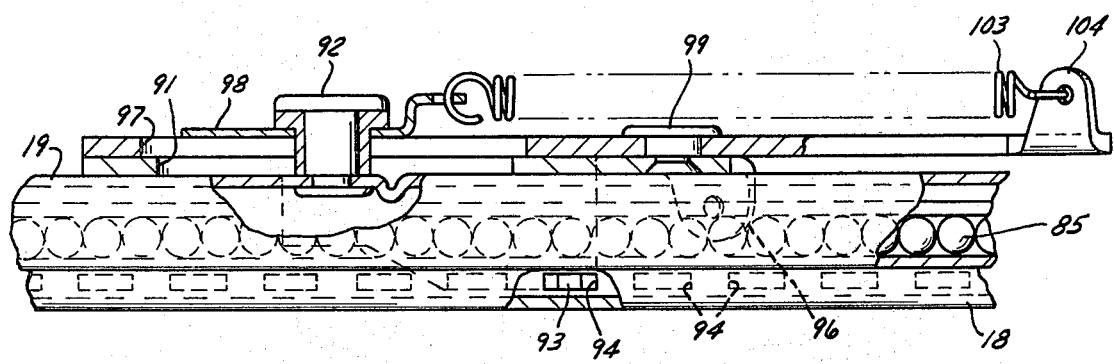
FIG. 6 is a fragmentary view in vertical section, taken on the plane of the line 6—6 in FIG. 2.
Figure 7:
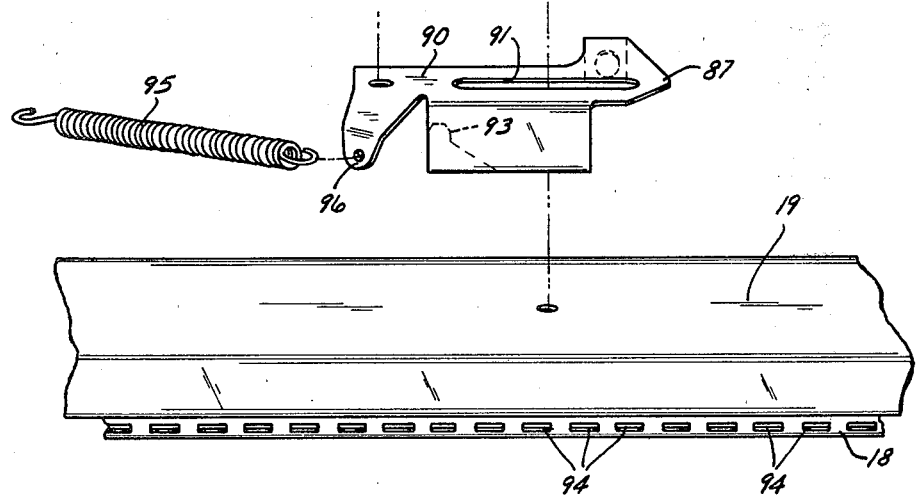
FIG. 7 is an exploded perspective view of the parts of the mechanism that are shown in FIG. 6.

In the condition of the mechanism that is shown in FIG. 3, the lever handle 89 is in an intermediate position, somewhat to the rear of its position shown in FIG. 2, and fore-and-aft shock isolation is locked out. As the handle 89 is moved to its FIG. 3 position, each control member 88 is swung edgewise about its pivot connection 99 to a position in which the front shoulder rivet 92 is in an apex portion of the triangular cutout 97, so that the control member 88 cooperates with the latching member 87 to prevent fore-and-aft motion of the front shoulder rivet 92 relative to the rail channel 18 to which the latching member 87 is locked, thus confining the guideways 19 and the seat part 6 against fore-and-aft motion.

The lug 104 on the control member 88, to which the rear end of the spring 103 is connected, is spaced a substantial distance behind the rear shoulder rivet 99 about which the control member swings. Therefore, as each control member 88 is swung between its FIG. 2 position and its FIG. 3 position, its tension spring 103 swings across the pivotal connection 99 and provides a toggle bias upon the control member that tends to maintain it in the selected one of those two positons.

For fore-and-aft adjustment of the seat part 6, the lever handle 89 is swung to a rearmost position shown in FIG. 4. As it moves to that position, it pivots about the front shoulder rivet 92, and therefore, by reason of its connection 99 with the latching member 87, it swings the latter out of its normal position and to an adjusting position in which the tongue or latch part 93 is disengaged from the notches 94 in the rail channel 18, so that the seat part 6 can be freely slid back and forth relative to the upper carriage 16. As pointed out above, the latching member 87 is swung to this releasing position against a biasing force exerted upon it by the tension spring 95, so that upon release of the lever handle 89 the latching member 87 tends to return to its normal position. Note that when the lever handle 89 is in its FIG. 4 adjusting position, the front shoulder rivet 92 is centered between the ends of the slot 91 in the latching member, so that when the lever handle is subsequently returned to its forward position (FIG. 2) for fore-and-aft isolation, the static position of the seat part 6 will be the same as its adjusted position.

From the foregoing description taken with the accompanying drawings, it will be apparent that this invention provides a seat suspension which has simple and very efficient provision for independent fore-and-aft adjustment combined with provision for fore-and-aft shock isolation that can be selectively cut in or cut out.

What is claimed as the invention is:

1. A seat suspension having a seat part supported on a suspension part for fore-and-aft motion relative to the suspension part, said seat suspension being characterized by:
   A. a latching member;
   B. cooperating means on the seat part and on said latching member connecting the latter with the seat part
      (1) to swing relative thereto about a first axis, between a normal position wherein a latch part on the latching member engages said suspension part to confine the latching member against fore-and-aft movement relative to the suspension part and a releasing position wherein said latch part is disengaged from the suspension part, and
      (2) said cooperating means providing for limited fore-and-aft sliding of the seat part relative to the latching member when the latter is in its normal position;
   C. a manually shiftable control member;
   D. pivot means connecting said control member with the latching member for swinging relative thereto about a second axis which is spaced from and parallel to said first axis, whereby said control member is carried between an intermediate position and a first limit position which is spaced in one direction from said intermediate position and wherein the control member leaves the latching member free for fore-and-aft sliding relative to the seat part; and
   E. cooperating abutment means on the seat part and on the control member, engaged when the control member is in its said intermediate position to confine the control member against fore-and-aft movement relative to the seat part to thus lock the latter to the latching member, said abutment means providing a fulcrum about which the control member can be swung in the opposite direction, from its intermediate position to the second limit position, while said pivot means constrains the latching member to swing to its releasing position.

2. The seat suspension of claim 1, further characterized by:
   said cooperating means on the seat part and on said latching member comprising
      (1) other pivot means fixed to the seat part to move therewith, and
      (2) said latching member having an elongated slot therein in which said other pivot means is received and which extends fore-and-aft when the latching member is in its normal position.

3. The seat suspension of claim 2, further characterized by:
   said control member having a substantially triangular cutout therein in which said other pivot means is received and which has a portion that registers with said slot in the latching member when the control member is at its said first limit position, said cutout having an apex portion wherein said other pivot means engages to provide said cooperating abutment means.

4. The seat suspension of claim 1, further characterized by:
(1) a first tension spring connected between said latching member and the seat part to bias said latching member to its normal position and to bias the seat part in one of the fore-and-aft directions relative to the suspension part; and (2) a second tension spring
   (a) having at one end thereof a connection with said seat part substantially at said first axis and
   (b) having at its other end a connection with said control member which is spaced from said second axis, at the side thereof remote from said first axis,
so that said second tension spring biases the seat part in the other of the fore-and-aft directions and provides a toggle bias upon the control member that tends to maintain it in a selected one of its said intermediate and first limit positions.

* * * * *